United States Patent Office 3,166,908
Patented Jan. 26, 1965

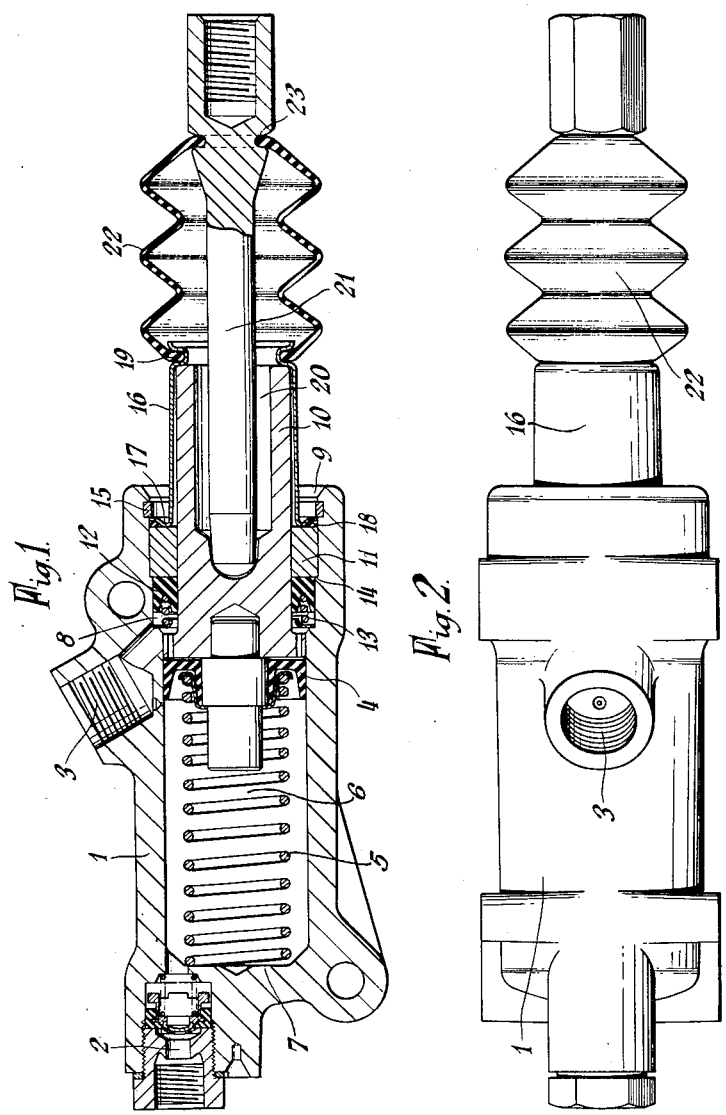

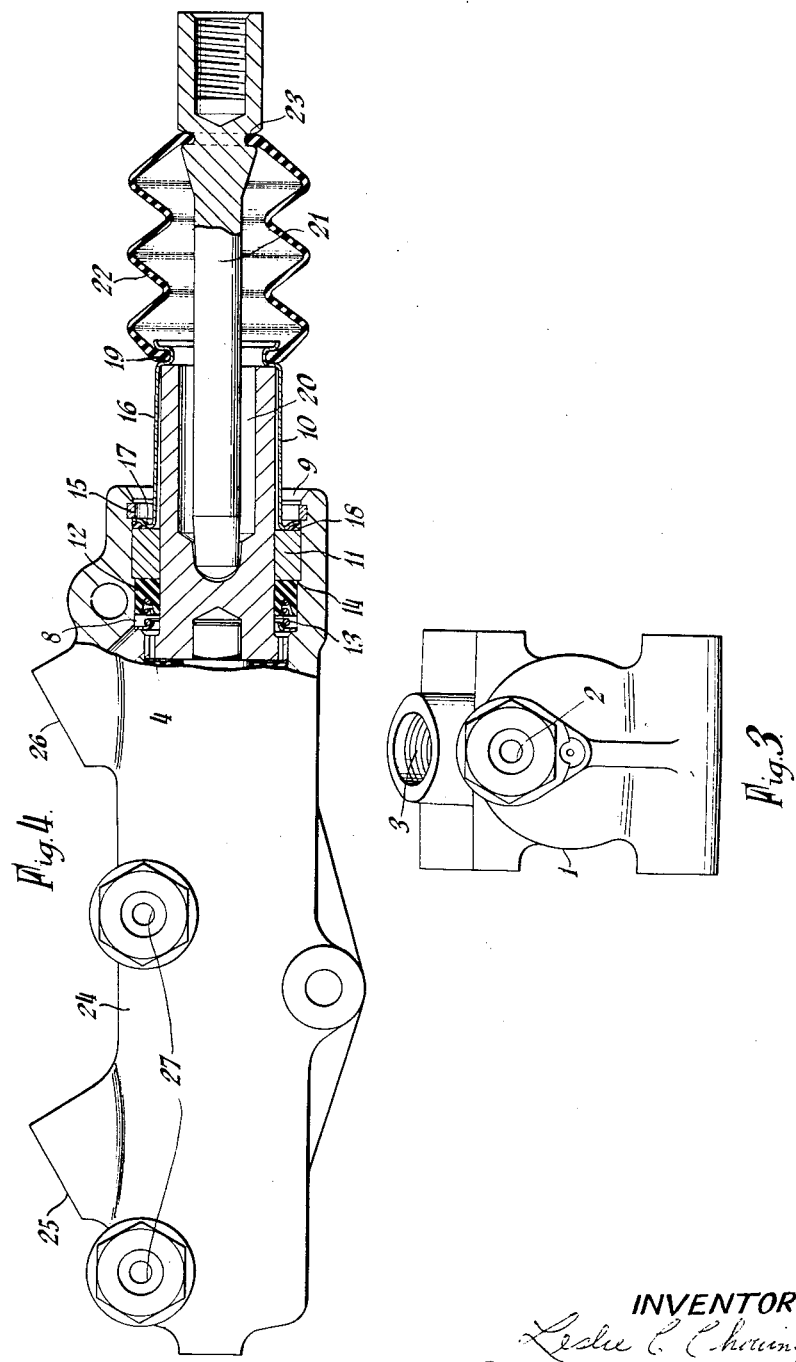

3,166,908
FLUID PRESSURE MASTER CYLINDERS
Leslie C. Chouings, Leamington Spa, England, assignor to Automotive Products Company Limited, Leamington Spa, Warwickshire, England
Filed Oct. 15, 1962, Ser. No. 230,510
Claims priority, application Great Britain, Oct. 17, 1961, 37,211
1 Claim. (Cl. 60—54.6)

This invention relates to fluid pressure master cylinders for fluid pressure systems, for example fluid pressure braking systems, of the kind in which axial displacement from a retracted position of at least one piston in a cylinder by actuation of operator controlled means coupled by a push rod to one piston, results in discharge of the pressure fluid from the master cylinder.

In a master cylinder of the kind above referred to as at present constructed the piston operatively connected to the push rod has an extension on the side opposite to the pressure side thereof and herein referred to as the rear of the piston, the extension having one or more lands which are a sliding fit in the cylinder to provide adequate bearing area in the cylinder for the piston, the push rod itself passing into the cylinder through a gland in one end of the cylinder with the inner end of the push rod operatively coupled to the adjacent end of the piston extension. Thus with this construction the cylinder must be of sufficient length to accommodate the piston combined with the extension thereon with the result that a comparatively long cylinder is required for any given stroke. The invention has for its object to provide a construction which enables the cylinder length to be shorter than hitherto for a corresponding stroke of the piston.

To this end in accordance with the invention it is proposed to provide in a master cylinder of the kind hereinbefore set forth a cylinder having a bore space the length of which is sufficient to permit the required piston stroke, the piston extension projecting outwardly of the cylinder bore when the piston is in the fully retracted position, the extension having a smooth periphery and passing through a bush which provides adequate bearing area for the extension during axial movement thereof, sealing means being disposed between the bush and the rear of the piston to prevent leakage of fluid around the extension periphery. Advantageously a sleeve is provided which surrounds the piston extension and prevents the deposit of dirt or other foreign matter on the periphery of the piston extension, the outer end of the sleeve providing a stop limiting the outward movement of the piston to the retracted position.

An embodiment of the invention will now be described by way of example by aid of the accompanying drawings in which:

FIGURE 1 shows in longitudinal section, a single type master cylinder constructed in accordance with the invention and as used for example, in a hydraulic braking system;

FIGURE 2 is a top plan view of FIGURE 1; and

FIGURE 3 is a view as seen from the left of FIGURE 1.

FIGURE 4 shows partly in section, a tandem type master cylinder constructed in accordance with the invention and as used for example in a hydraulic braking system.

The single type master cylinder shown in FIGURES 1 to 3 of the accompanying drawings is generally of known construction and comprises a tubular body 1 having a valve controlled opening 2 at one end for connection to a hydraulic braking system and a further opening 3 through the wall of the tubular body adapted for connection to a source of supply of hydraulic liquid. A spring loaded piston 4 slidable in the bore of the tubular body is urged by the action of compression spring 5 to a retracted position remote from the end having the valve controlled opening 2 the piston when in the retracted position dividing the bore of the tubular body into a space 6 between the leading face of the piston and the opposite end wall 7 of the body of sufficient length to permit the working stroke of the piston and a space 8 of smaller length between the trailing face of the piston and the opposite open end 9 of the tubular body. The opening 3 through the wall of the tubular body is positioned in the axial length of the body so that the leading face of the piston is clear of the said opening when the piston is in the retracted position so that the bore space 6 is open to the hydraulic liquid supply source. Extending outwardly from the trailing face of the piston 4 is a piston rod 10 which provides the piston extension the piston rod passing through a bush 11 disposed in the bore space 8 of smaller length behind the piston a double lip seal 12 being disposed in this space and between the opposite faces of the bush and piston. The lip seal 12 is spring loaded by compression spring 13 so as to be held axially in position against the bush the seal lips being in contact with the periphery of piston rod and the bore of the tubular body respectively to prevent the leakage of hydraulic fluid. The bush itself is axially located by a shoulder 14 in the bore and a spring retaining ring 15. The piston rod projects outwardly through the bush and out of the tubular body a sleeve 16 being provided so as to enclose the projecting end of the piston rod. The inner end of the sleeve 16 has an external flange 17 which is disposed between the opposite faces of the bush 11 and the spring retaining ring 15 the flange being formed to provide an annular groove to receive a sealing ring 18. The outer end of the sleeve is formed to provide an internal flange of channel section the inner annular wall 19 of which provides a stop against which the outer end of the piston rod 10 abuts when the piston is in the retracted position, thus limiting the outward movement of the piston.

The piston rod 10 is provided with a cavity 20 extending inwardly from the outer end to receive a push rod 21 the outer end of which is adapted for connection to the linkage of a brake pedal, operation of the brake pedal to effect a braking operation causing movement of the push rod resulting in axial displacement of the piston to actuate the master cylinder in known manner. Advantageously the inner end of the push rod is spherical and engages a correspondingly shaped recess at the inner end of the cavity in the piston rod thus permitting universal movement of the push rod. A flexible boot 22 is provided around the push rod, one end of the boot being disposed in the channel of the channel section flange at the outer end of the sleeve 16, the opposite end of the boot being disposed in an annular groove 23 in the push rod.

The piston construction of the tandem master cylinder shown in FIGURE 4 of the accompanying drawings is identical to that described and shown in connection with FIGURE 1 and accordingly the same reference numerals are shown to indicate corresponding parts. The tandem master cylinder itself is of conventional construction and operation and does not therefore require detailed description. The master cylinder comprises a tubular body 24 having a pair of outlets 25, 26 connectable respectively for example to the front and rear brakes of the braking system and a pair of inlets 27 connectable to the usual storage tank or tanks containing the hydraulic liquid.

I claim:

A master cylinder comprising a tubular body forming a cylindrical piston space having a length sufficient to permit a predetermined piston stroke, a piston slidably disposed in said space, said piston having a front peripheral portion and a rear peripheral portion, said front portion being of substantially larger diameter than said rear portion, said space having a front circumferential surface and a rear circumferential surface, said front surface being of substantially larger diameter than said rear surface, said piston front portion being slidably disposed in said front surface, and said rear piston portion being slidably disposed adjacent said rear surface, biasing means in said space adjacent said front surface normally urging said piston to a retracted position adjacent said rear surface of said space, said piston having a cylindrical extension adjacent the rearward portion of said rear portion forming an elongated axial bore centrally of said rear portion, said extension projecting outwardly beyond the rear end of the cylinder when said piston is in a retracted position and having the same diameter as said rear portion, a push rod disposed in said axial bore and being of substantially smaller diameter than the bore diameter and projecting outwardly of said axial bore, a reduced shoulder formed in said rear surface, said shoulder being formed in spaced relationship with said front surface and the rear end of said cylinder, an annular ring bush member disposed in said rear surface positioned with its front end abutting said shoulder to prevent forward axial movement of the bush member, said ring bush member forming a bearing surface for said extension during axial movement, first sealing member disposed around said extension and adjacent the front end of said ring bush member, a second sealing member disposed in said rear surface adjacent the rear side of said bush member, a sleeve surrounding said extension and secured at one end against said second sealing member, said sleeve sealing off and enclosing the portion of said extension projecting out of said cylinder, the inner front end of said sleeve having an annular outwardly flared portion abutting said second sealing member and the rear side of said ring member, a retainer ring disposed in a circumferential recess in said rear surface, said ring abutting said flared portion to prevent rearward axial movement of said bush member, an annular inwardly extending rim forming a stop for the extension disposed in the rear end of said sleeve beyond the rear end of said cylinder, and a flexible bellows member secured to said stop and push rod and enclosing a portion of said push rod.

References Cited by the Examiner
UNITED STATES PATENTS

| | | | |
|---|---|---|---|
| 2,074,719 | 3/37 | Carroll | 60—54.6 |
| 2,136,835 | 11/38 | Begg | 60—54.6 |
| 3,044,268 | 7/62 | Harrison | 60—54.6 |

JULIUS E. WEST, *Primary Examiner.*

ROBERT R. BUNEVICH, *Examiner.*